United States Patent
Bowden, Jr. et al.

(10) Patent No.: US 11,436,514 B2
(45) Date of Patent: Sep. 6, 2022

(54) DESIGNING PLANS USING REQUIREMENTS KNOWLEDGE GRAPH

(71) Applicant: Chevron U.S.A. Inc., San Ramon, CA (US)

(72) Inventors: Larry A. Bowden, Jr., Houston, TX (US); Juan Esteban E. Montero, Houston, TX (US); Shuxing Cheng, Houston, TX (US); Adam M. Reeder, Houston, TX (US); Xin Feng, Houston, TX (US); Steven R. Szabo, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 95 days.

(21) Appl. No.: 16/837,774

(22) Filed: Apr. 1, 2020

(65) Prior Publication Data
US 2021/0312311 A1   Oct. 7, 2021

(51) Int. Cl.
| | |
|---|---|
| *G06F 17/10* | (2006.01) |
| *G06N 7/00* | (2006.01) |
| *G06F 16/901* | (2019.01) |
| *G06N 20/00* | (2019.01) |
| *G06F 30/20* | (2020.01) |
| *G06F 30/17* | (2020.01) |

(52) U.S. Cl.
CPC ......... *G06N 7/005* (2013.01); *G06F 16/9024* (2019.01); *G06F 30/17* (2020.01); *G06F 30/20* (2020.01); *G06N 20/00* (2019.01)

(58) Field of Classification Search
CPC .... G06N 7/005; G06N 20/00; G06F 16/9024; G06F 30/20; G06F 30/17

USPC .......................................................... 703/1
See application file for complete search history.

(56) References Cited

U.S. PATENT DOCUMENTS

| | | | |
|---|---|---|---|
| 8,639,509 B2 | 1/2014 | Weng | |
| 2014/0172417 A1 | 6/2014 | Monk, II | |
| 2016/0189028 A1* | 6/2016 | Hu | G06N 5/02 706/46 |
| 2020/0277847 A1* | 9/2020 | Rojas | H04L 63/029 |
| 2021/0302612 A1* | 9/2021 | Venkatakrishnan | E21B 21/06 |

FOREIGN PATENT DOCUMENTS

| | | |
|---|---|---|
| EP | 1783744 B1 | 10/2011 |
| WO | 1988008160 | 10/1988 |

OTHER PUBLICATIONS

Description PCT International Search Report and Written Opinion, International Application No. PCT/US20/62018, dated Mar. 18 (7 pages).

* cited by examiner

*Primary Examiner* — Andre Pierre Louis
(74) *Attorney, Agent, or Firm* — Esplin & Associates, PC

(57) ABSTRACT

A requirements knowledge graph may include nodes for different elements of a requirement's relationship to physical characteristics, such as the requirement and the associated unsafe conditions, control objects, and hazards. A connection between nodes may define a relationship between the corresponding elements. The requirement, that is decomposed into a subject, an object, a predicate, and a context, may define a rule for the control object in the unsafe condition to avoid the hazard. A model for a plan (e.g., drilling plan for a well, design for a drilling tool) may be constructed based on the requirements knowledge graph. The plan may be generated based on the model.

20 Claims, 5 Drawing Sheets

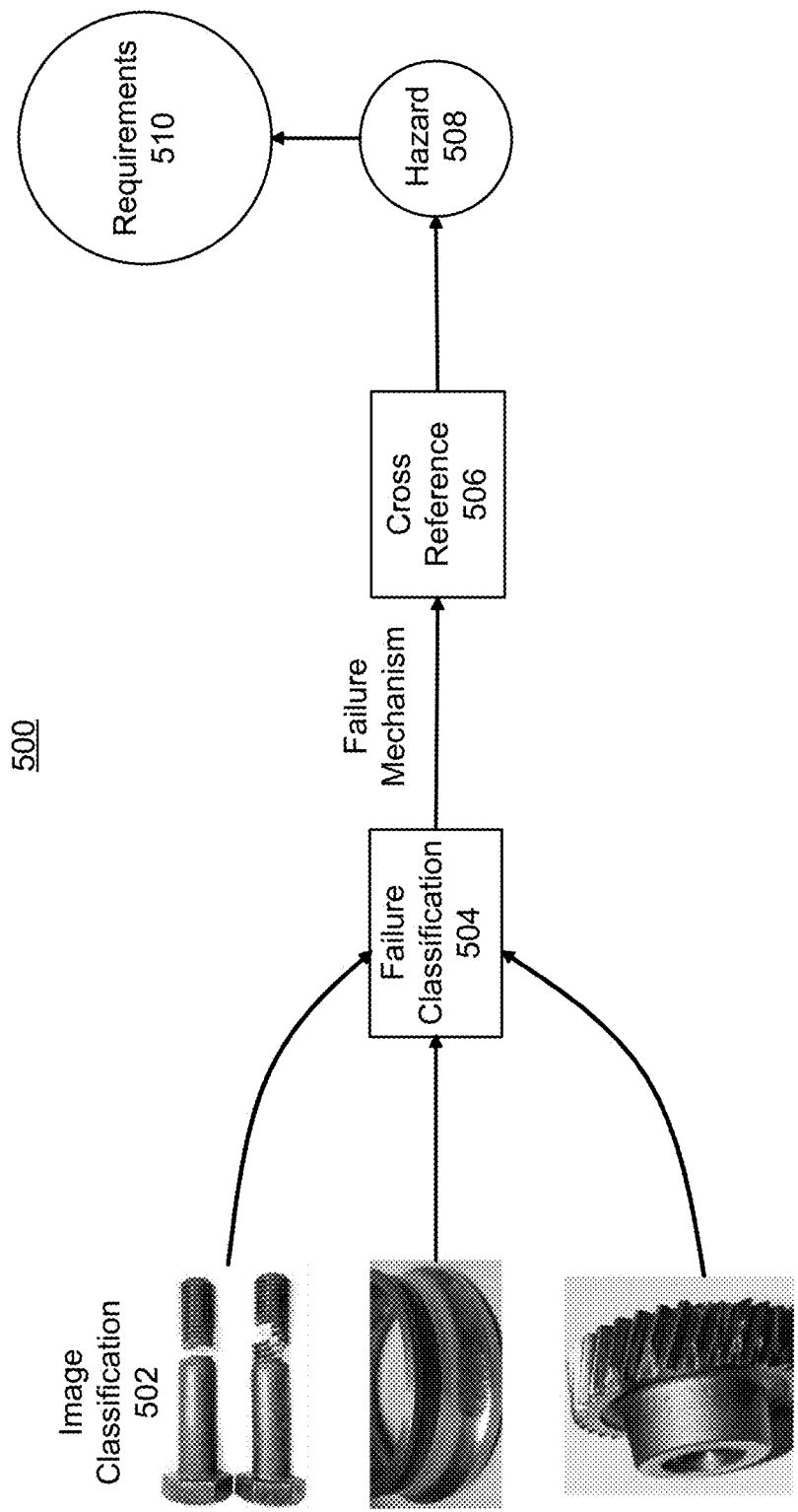

DESIGNING PLANS USING REQUIREMENTS KNOWLEDGE GRAPH

The present disclosure relates generally to the field of designing plans based on a model that is constructed using a requirements knowledge graph.

BACKGROUND

Designing plans (e.g., roadmaps, component design) to fulfill requirements may be difficult and time consuming. Accounting for failures and/or deficiencies of the plan while fulfilling requirements may increase complexity of designing plans. Revising system designs for failure mechanisms due to local operating characteristics is time consuming and often not cost effective.

SUMMARY

This disclosure relates to designing plans. Graph information and/or other information may be obtained. The graph information may define a requirements knowledge graph. The requirements knowledge graph may include nodes for elements of a requirement's relationship to physical characteristics, such as the requirement, and associated unsafe condition(s), control object(s), and hazard(s). A connection between the nodes of the requirements knowledge graph defining a relationship between corresponding elements. The requirement, which may be decomposed into a subject, an object, a predicate, and a context, may define a rule for a control object to avoid a hazard in an unsafe condition. A model for a plan may be constructed based on the requirements knowledge graph and/or other information. The plan may be generated based on the model and/or other information.

A system that designs plans may include one or more electronic storage, one or more processors and/or other components. The electronic storage may store graph information, information relating to requirements knowledge graph, information relating to nodes of requirements knowledge graph, information relating to connection between the nodes, information relating to relationship between elements corresponding to the nodes, information relating to requirements, information relating to unsafe conditions, information relating to control objects, information relating to hazards, information relating to model, information relating to plan, and/or other information.

The processor(s) may be configured by machine-readable instructions. Executing the machine-readable instructions may cause the processor(s) to facilitate designing plans. The machine-readable instructions may include one or more computer program components. The computer program components may include one or more of a graph information component, a model component, a plan component, and/or other computer program components.

The graph information component may be configured to obtain graph information and/or other information. The graph information may define a requirements knowledge graph. The requirements knowledge graph may include nodes for elements. The elements may include a requirement, an unsafe condition, a control object, a hazard, and/or other elements. Connections between nodes of the requirements knowledge graph may define relationships between corresponding elements. The requirement may define a rule for the control object to avoid the hazard in the unsafe condition.

In some implementations, a requirement node may include sub-nodes for sub-parts of the requirement. The sub-parts of the requirement may include a subject, an object, a predicate, a context, and/or other sub-parts.

The model component may be configured to construct a model for a plan. The model for the plan may be constructed based on the requirements knowledge graph and/or other information. In some implementations, the plan may include a drilling plan for a well. In some implementations, the plan may include a design for a drilling tool.

The plan component may be configured to generate the plan. The plan may be generated based on the model and/or other information. In some implementations, generating the plan based on the model may include obtaining violation information and/or other information. The violation information may define one or more scenarios that resulted in violation of the requirement. One or more parameters of the plan may be determined based on the scenario(s) that resulted in violation of the requirement and/or other information.

In some implementations, the scenario(s) that resulted in violation of the requirement may include one or more simulated scenarios. In some implementations, the scenario(s) that resulted in violation of the requirement may include one or more real-world scenarios. In some implementations, a real-world scenario may be identified based on image classification.

In some implementations, the plan may include a design for a drilling tool, and determining the parameter(s) of the design based on the scenario(s) that resulted in violation of the requirement may include redesigning one or more characteristics of the drilling tool based on the scenario(s) that resulted in violation of the requirement.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 5 illustrates an example flow for designing a tool.

DETAILED DESCRIPTION

The present disclosure relates to designing plans. A model based systems engineering design that is based on a computational knowledge graph allows category theory to be utilized as formalized logical basis for the design. A requirements knowledge graph may include nodes for different elements of a requirement's relationship to physical characteristics, such as the requirement and the associated unsafe conditions, control objects, and hazards. A connection between nodes may define a relationship between the corresponding elements. The requirement, that is decomposed into a subject, an object, a predicate, and a context, may define a rule for the control object in the unsafe condition to avoid the hazard. A model for a plan (e.g., drilling plan for a well, design for a drilling tool) may be constructed based on the requirements knowledge graph. The plan may be generated based on the model.

Figure 1:
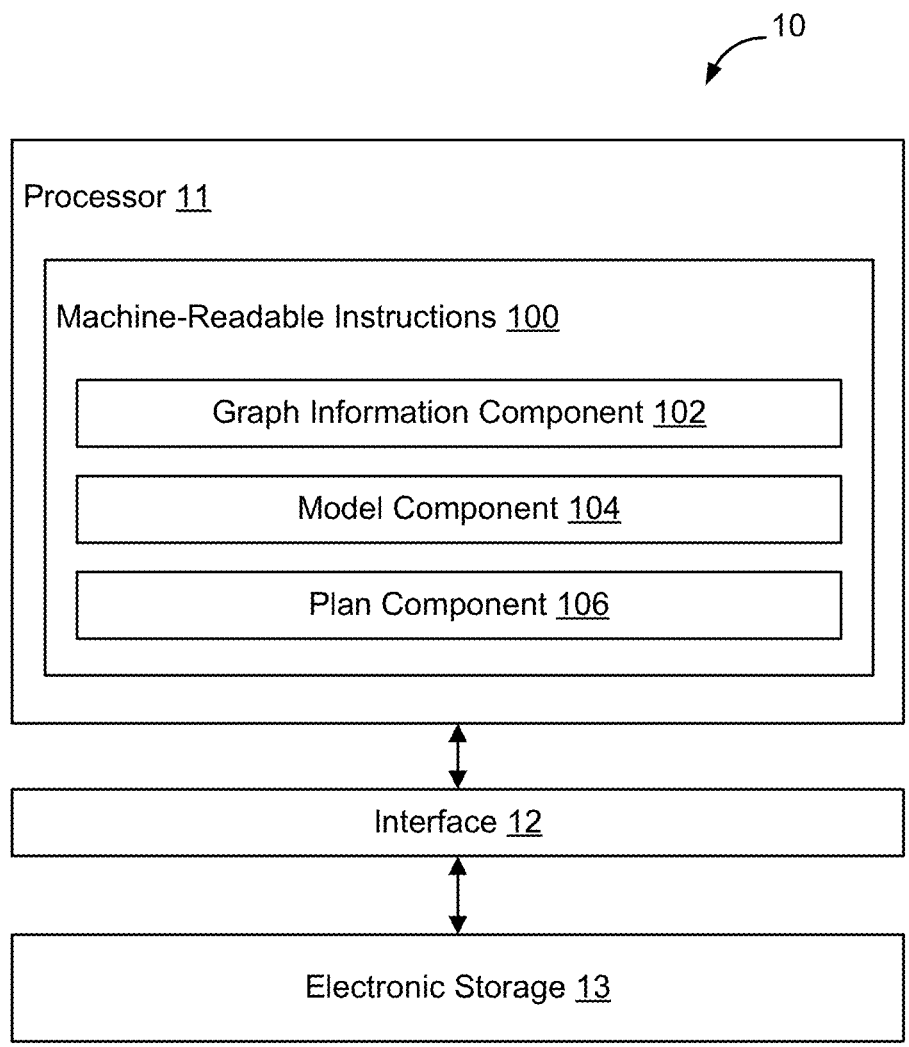
FIG. 1 illustrates an example system that designs plans.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, and/or other components. Graph information and/or other information may be obtained by the processor 11. The graph information may define a requirements knowledge graph. The requirements knowledge graph may include nodes for elements of a requirement's relationship to physical characteristics, such as the requirement, and associated unsafe condition(s), control object(s), and hazard(s). A connection between the nodes of the requirements knowledge graph defining a relationship between corresponding elements. The requirement, which may be decomposed into a subject, object, predicate, and context, may define a rule for a control object to avoid a hazard in an unsafe condition. A model for a plan may be constructed by the processor 11 based on the requirements knowledge graph and/or other information. The plan may be generated by the processor 11 based on the model and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store graph information, information relating to requirements knowledge graph, information relating to nodes of requirements knowledge graph, information relating to connection between the nodes, information relating to relationship between elements corresponding to the nodes, information relating to requirements, information relating to unsafe conditions, information relating to control objects, information relating to hazards, information relating to model, information relating to plan, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate designing plans. The machine-readable instructions 100 may include one or more computer program components. The machine-readable instructions 100 may include a graph information component 102, a model component 104, a plan component 106, and/or other computer program components.

The graph information component 102 may be configured to obtain graph information and/or other information. Obtaining graph information may include one or more of accessing, acquiring, analyzing, determining, examining, identifying, loading, locating, opening, receiving, retrieving, reviewing, selecting, storing, and/or otherwise obtaining the graph information. The graph information component 102 may obtain graph information from one or more locations. For example, the graph information component 102 may obtain graph information from a storage location, such as the electronic storage 13, electronic storage of a device accessible via a network, and/or other locations. The graph information component 102 may obtain graph information from one or more hardware components (e.g., a computing device) and/or one or more software components (e.g., software running on a computing device).

The graph information may define a requirements knowledge graph. A requirements knowledge graph may refer to graph that represents requirements and associated physical characteristics using nodes and relationships between them using connections between nodes. That is, a requirements knowledge graph may include entities of different types as nodes and relationships between the entities as edges. A requirements knowledge graph may integrate information relating to requirements into an ontology and may enable derivation of new knowledge using graph logic. A requirements knowledge graph may include modeling in graph form of a requirements knowledge domain. A requirements knowledge graph may include and/or enable conversion of requirements and associated physical characteristics in logical (e.g., mathematical) formulations.

A requirement may refer to a physical and/or functional need that is to be met/satisfied. For example, a requirement may refer to an engineering requirement. A requirement may refer to a physical and/or functional need that a design, product, equipment, and/or process aims to meet/satisfy. A requirement may refer to desired and/or necessary function, attribute, capability, characteristic, and/or quality of the design, product, equipment, and/or process. A requirement may refer to a rule that is to be followed when using the design, product, equipment, and/or process. A requirement may provide one or more constraints for generating a plan.

In some implementations, a requirements knowledge graph may be generated, structured, and/or referenced using a systems theoretic process analysis (STPA) process. STPA may refer to a process of generating engineering requirement using one or more control structures. STPA may refer to a process of examining engineering systems/components to identify unsafe conditions and/or hazards, and generating one or more requirements (requirement(s)) to prevent the unsafe condition(s) and/or hazard(s). An unsafe condition may result from unsafe control action(s) (e.g., action not given, action given incorrectly, action with wrong timing) by, of, and/or for control object(s). A control object may exhibit control action and/or feedback. An unsafe condition may include one or more conditions that may in the hazard. The unsafe conditions may be identified to create corresponding safety constraints. A hazard may refer to a system state and/or a set of conditions that, in a particular context (e.g., set of worst-case conditions), may lead to one or more problems (e.g., accident, loss).

In some implementations, a requirements knowledge graph may be generated, structured, and/or referenced in accordance with one or more standards and/or one or more guidelines. For instance, a requirements knowledge graph may be generated, structured, and/or referenced in accordance with International Council on Systems Engineering (INCOSE) standards/guidelines. A requirements knowledge graph may include nodes for elements of a requirement, such as a requirement's relationship to physical characteristics. For example, the elements of a requirements knowledge graph may include requirement(s), and associated unsafe condition(s), control object(s), and hazard(s). Connections between nodes of the requirements knowledge graph may define relationships between corresponding elements. For example, a requirement may define one or more rules for the control object(s) to avoid the hazard(s) in the unsafe condition(s).

The graph information may define a requirements knowledge graph by including information that defines (e.g., identifies, reflects, quantifies) content of the requirements knowledge graph, such as the nodes, edges, and/or other content of the requirements knowledge graph. For instance, the graph information may include information that makes up and/or is used to determine elements and connections between elements, and/or other content of the requirements knowledge graph. Other types of graph information are contemplated.

Figure 3:
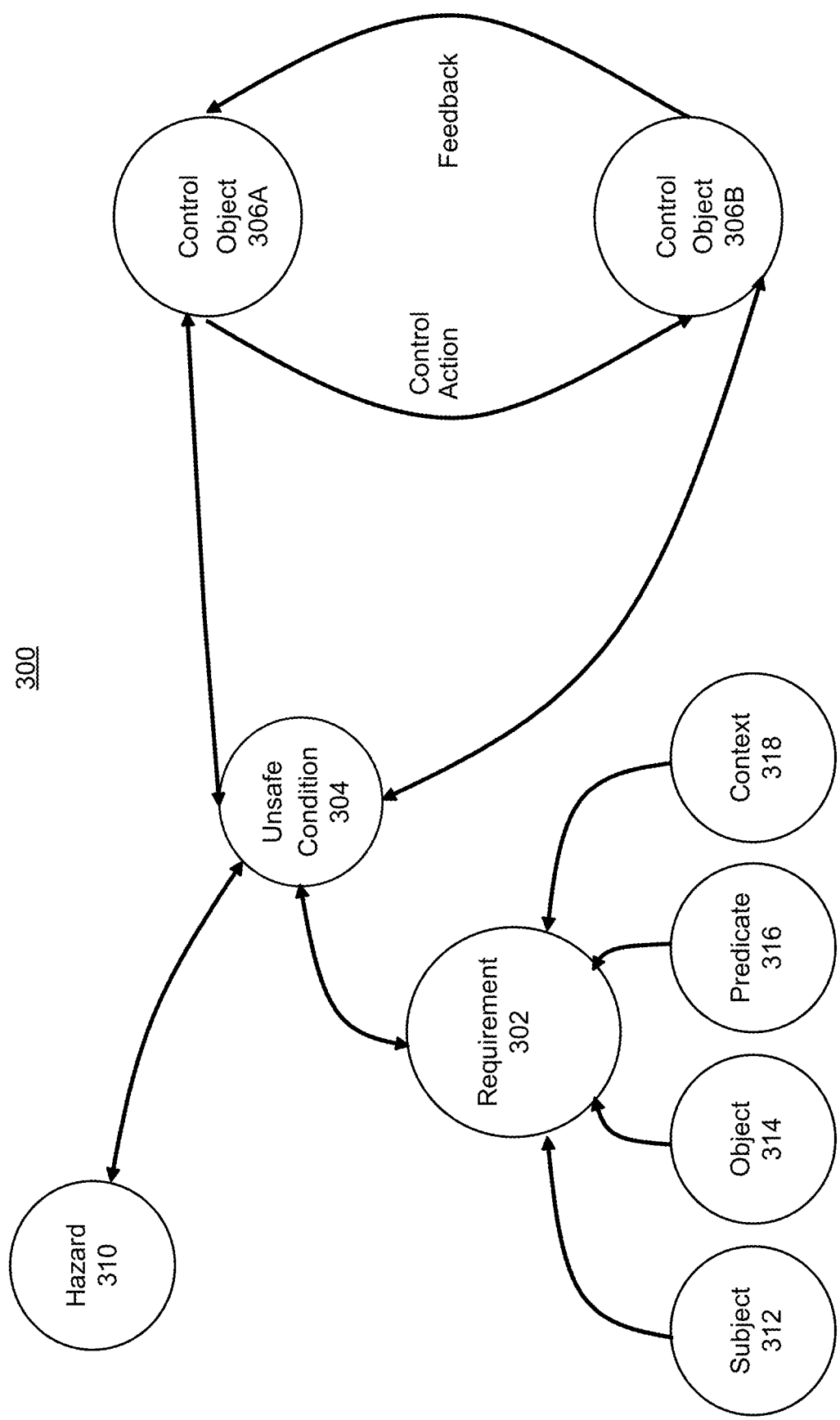
FIG. 3 illustrates an example requirements knowledge graph.

FIG. 3 illustrates an example requirements knowledge graph 300. The requirements knowledge graph 300 may include a requirement node 302, an unsafe condition node 304, control object nodes 306A, 306B, a hazard node 310, and/or other nodes. The requirement node 302 may represent a requirement. The unsafe condition node 304 may represent unsafe condition of the requirement for/relating to the control objects represented by the control object nodes 306A, 306B. The hazard node 310 may represent a hazard associated with the unsafe condition represented by the unsafe condition node 304.

The requirement node 302 may include sub-nodes that represent sub-parts of the requirement. The sub-parts of the requirement may include a subject, an object, a predicate, a context, and/or other sub-parts of the requirement. The subject may refer to one or more entities about which a statement in the requirement is made. The object may refer to one or more entities that may be acted upon by the subject. The predicate may modify description of one or more things/entities within the requirements. The context may refer to/define the scope of the requirement, such as one or more circumstances that form the setting for the requirement. In some implementations, one or more sub-parts of a requirement may be identified further based on one or more standards and/or one or more guidelines. For example, the sub-part(s) of a requirement may be identified in accordance with the INCOSE Guide for Writing Requirements and/or other standards/guidelines.

The control objects 306A, 306B may represent control objects (e.g., control structures, components, controllers) that may exhibit control action and/or feedback. Examples of control objects include equipment, sub systems, systems, facilities, people, organizations, and/or entities. The control objects may interact with other control objects by sending a control action and/or feedback, and a requirements knowledge graph may include edges between nodes that represent the control action or feedback information between the corresponding control objects. For example, the requirements knowledge graph 300 may include edges that represent a control action being sent from the control object 306A to the control object 306B, and a feedback being sent from the control object 306B to the control object 306A.

In some implementations, connections between nodes of the requirements knowledge graph 300 may be established based on type(s) of capabilities to be enabled through the of the requirements knowledge graph 300. Different relationships may be established based on the questions to be answered through the of the requirements knowledge graph 300. For example, different connections may be made between nodes and/or graph models based on whether the of the requirements knowledge graph 300 is to be used to design plans for drilling or to redesign components of drilling equipment.

Connections between the nodes of the requirements knowledge graph 300 may enable analysis that explores the relationships between the corresponding elements. For example, the connection between the nodes of the requirements knowledge graph 300 may enable analysis that that takes into account requirements, sub-parts of the requirements, control objects, unsafe conditions, hazards, relationships, and/or other thing/concepts represented by components of the requirements knowledge graph 300. Nodes and connections between the nodes of the requirements knowledge graph 300 may be used to generate logical formulations (e.g., mathematical formulations) of the requirement and associated physical characteristics. For example, the nodes and connections may be converted into logics (e.g., mathematical formulas), with the hazards being translated into failure modes.

The model component 104 may be configured to construct a model for a plan. A model for a plan may refer to a computer model (e.g., program, tool, script, function, process, algorithm) that may be used to generate the plan. A model for a plan may include a domain model that incorporates nodes/elements and connections/element relationships of the requirements knowledge graph. A model for a plan may utilize nodes/elements and connections/element relationships of the requirements knowledge graph to run simulations that test different features and/or characteristics of the plan.

A plan may refer to information that describes how a goal may be achieved. A plan may refer to a proposal, roadmap, guideline, design, diagram, scheme, and/or other formulation of things and/or action to achieve a goal. For example, a plan may include a drilling plan for a well. A drilling plan may provide information on what equipment is to be used to drill the well, information on how and/or when the equipment is to be used to drill the well, and/or other information on drilling the well. As another example, a plan may include a design for a drilling tool. A design for a drilling tool may provide information on components to be used to make (e.g., manufacture) the drilling tool and/or how the components are to be combined to make the drilling tool. A drilling tool may refer to a device or an implement designed and/or used for drilling. A drilling tool may be designed and/or used to drill one or more substances. A drilling tool may refer to portions of or entirety of a device/implement that performs drilling. For example, a drilling tool may refer to one or more portions of a drilling rig, such as a drill string, one or more portions of the drill string (e.g., bottom home assembly, transition pipe, drill pipe), and/or other portion(s) of the drilling rig. Other examples of plan include risk management plan to identify, assess, and/or quantify risks, well design to improve stability of wells and/or increase drilling/production efficiency, and/or design of manufacturing site (e.g., factory) to build drilling tools. Other types of plan are contemplated.

A model for a plan may be constructed based on the requirements knowledge graph and/or other information. A model for a plan may be constructed based on nodes/elements and connections/element relationships of the requirements knowledge graph. The nodes/elements and connections/element relationships of the requirements knowledge graph may define one or more rules are incorporated into the plan. Use of rule-based requirements (rather than hard-coded requirements) may enable flexibility in generating plans. That is, rule-based requirements may provide logic that needs to be followed by the rules in generating a plan rather than providing specific values for use in the plan (e.g., providing rule(s) to determine size of equipment component rather than providing a fixed size value). A model for a plan may incorporate, combine, and/or utilize logical formulations (e.g., mathematical formulations) of the requirement and associated physical characteristics to generate the plan. A model for a plan may connect different requirements and/or components of different requirements based on matching characteristics. For example, a model for equipment design may incorporate logical formations of different requirements that are associated with the same hazard and/or unsafe condition to generate a plan to avoid the hazard and/or the unsafe condition when designing the equipment. A model for a drilling plan may dynamically change constraints and/or limits for a drilling operation based on conditions of the drilling operation, which may enable more cost effective and more appropriate drilling operating and/or drilling designs and enable drilling at lower costs and/or faster speeds than a static drilling plan. The nodes/elements and connections/element relationships of the requirements knowledge graph may be used to formulate rules/equations for calculating the constraints/limits.

Figure 4:
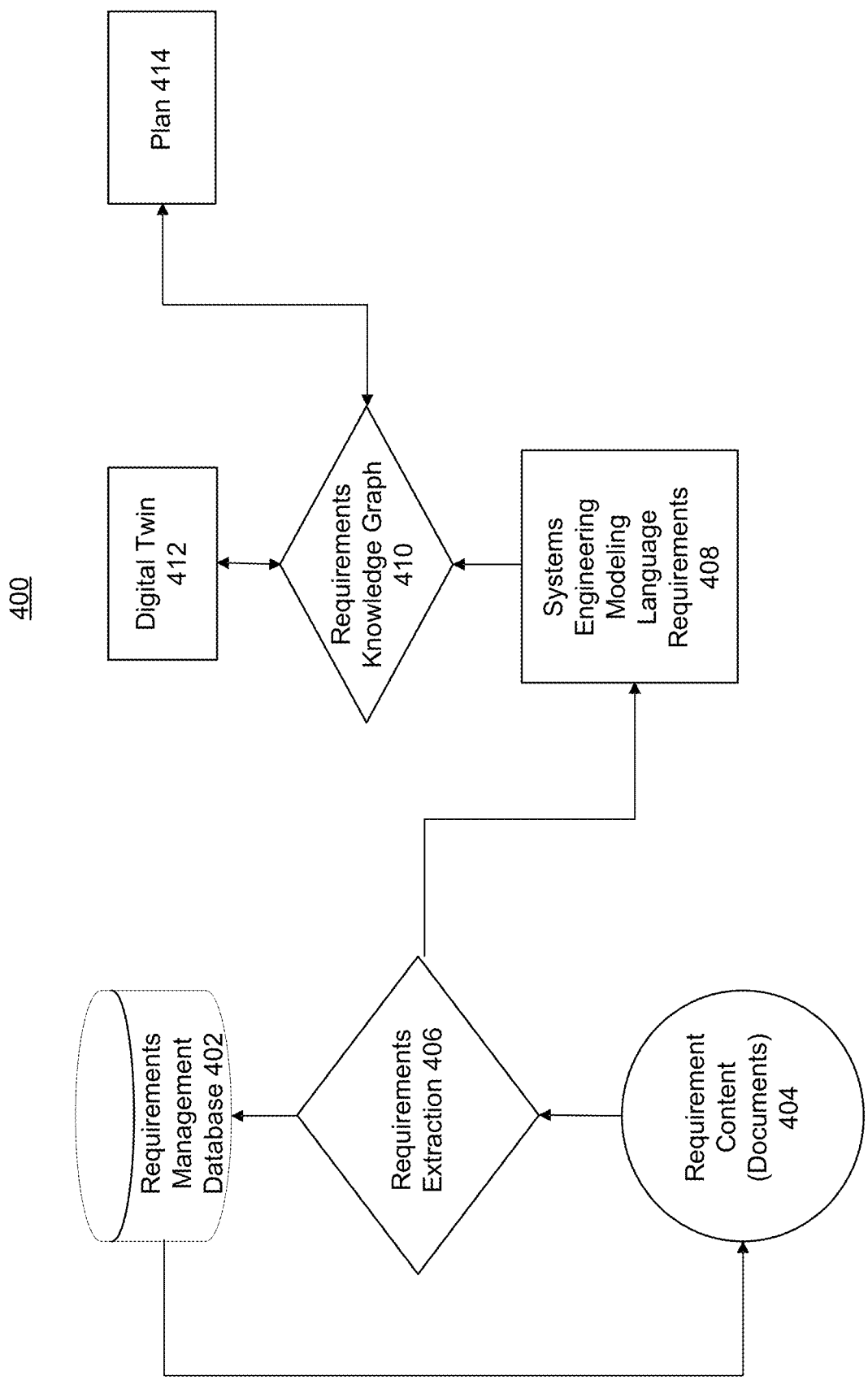
FIG. 4 illustrates an example architecture for designing plans.

FIG. 4 illustrates an example architecture for designing plans 400. A requirements management database 402 may store requirements. The requirement management database may be used to store and manage requirements. The requirement management data may store and manage individual requirements and/or requirement documents including one or more requirements. In some implementations, the requirement management database may have an open architecture and/or support Simple Object Access Protocol (SOAP) for programmatic interaction. The requirements (with subject, object, predicate, and context) may be converted into graphical relationships for connection to other graphs/graph models.

A requirement may be stored separately from other requirement(s) and/or stored together with other requirement(s) by the requirements management database 402. For example, individual requirements may be stored separately in different files/documents. Multiple requirement may be stored together in a single file/document. For example, a requirement may be defined within one or more sentences, one or more paragraphs, one or more sections, and/or other groups of words within the requirement document. A requirement document may include other information relating to the design, product, equipment, and/or process. For example, a requirements document may include information defining background, definitions, explanations, footnotes, and/or other information that provide context for the requirements.

Requirement content (documents) 404 may be obtained from the requirements management database 402. For example, textual content of one or more requirements may be obtained from the requirements management database 402 based on queries, filters, and/or searches. Requirements extraction 406 may be performed on the content of the requirement(s) to identify components of the requirements. For example, requirements extraction 406 may include extraction of subject, object, predicate, and/or context of the requirement(s). The extracted information may be stored in the requirements management database 402 as attributes and/or metadata tags of the requirements.

In some implementations, requirements extraction 406 may utilize language processing (e.g., natural language processing, word/symbol detection) to analyze the content of the requirement for sub-part identification. In some implementations, requirements extraction 406 may include decomposition of the words of the requirement in prose format into the sub-parts. The words of the requirement in prose format (e.g., statement(s) in the requirement) may be broken up into the sub-parts, such as into subject, object, predict, context, and/or other sub-parts of the requirement. In some implementations, one or more analytics and/or requirements processing may be used to analyze the requirements. For example, the requirements may be analyzed based on one or more techniques described in U.S. patent application Ser. No. 16/395,189, titled Content-Sensitive Feature Score Generation, filed Apr. 25, 2019, entirely of which is incorporated herein by reference. In some implementations, one or more vector modeling engines may be used to analyze the requirement according to one or more standards and/or one or more guidelines (e.g., INCOSE standard/guideline).

Systems engineering modeling language requirements 408 may provide requirements of modeling language for systems engineering purposes. Systems engineering modeling language may include a general-purpose modeling language systems engineering applications. Systems engineering modeling language may support specification, analysis, design, verification, and validation of different systems in graphical form.

The results of requirements extraction 406 may be processed using systems engineering modeling language requirements 408 to generate a requirements knowledge graph 410. The requirements knowledge graph may be generated using category theory. The requirements knowledge graph 410 may include graphical representation of the information extracted by requirements extraction 406. Generation of the requirements knowledge graph 410 may be performed, supported, and/or facilitated by a knowledge platform. The knowledge platform may enable flexibility in modeling, and may allow data from different sources or different formats to be integrated, analyzed, and/or utilized together.

A digital twin 412 may enable modeling using the requirements knowledge graph 410. The digital twin 412 may provide model-based systems engineering and enable creation of simulation or designed based on rule-based systems engineering models. The digital twin 412 may run models that are constructed with the rules and/or constraints based on the requirements knowledge graph 410. For example, the digital twin 412 may use the models that incorporate rule-based requirements using logical formulations to improve (e.g., optimize) plans.

A plan 414 may be output using the requirements knowledge graph 410. Feedback from implementation of the plan 414 may be fed back to update the requirements knowledge graph 410. For example, when the plan 414 is used to drill a well, changes may be made due to conditions encountered during drilling. The changes may be fed back to update the model for generating drilling plans. For example, the changes may be fed back to update the model, which may then be used to generate a drilling plan for continued drilling operation that takes into account the changes that have been made in the past drilling operation. Such generation of the plan may enable optimization of the plan before and during implementation of the plan.

The plan component 106 may be configured to generate a plan. Generating a plan may include creating a new plan, revising an existing plan, and/or otherwise generating the plan. A plan may be generated based on the model and/or other information. The model constructed by the model component 104 may be run to generate the plan. In some implementations, the plan may be an output of the model. In some implementations, output of the model may be analyzed and/or used by the plan component 106 to generate the plan. In some implementations, the one or more numerical solvers and/or linear program solvers may be used to generate the plan. For example, the model may incorporate logical formulations (e.g., mathematical formulations) of the requirement and associated physical characteristics, and the numerical solver(s) and/or the linear program solver(s) may be used to determine recommended points (e.g., optimal points) for inclusion in the plan. The numerical solver(s) and/or the linear program solver(s) may be used determine recommended points for different scenarios and/or provide information on different sets of recommended points (e.g., provide tradeoffs and/or constraints for different sets of recommended points).

In some implementations, the plan may be generated based on violation of requirement(s). For example, generating the plan based on the model may include obtaining violation information and/or other information. The violation information may define one or more scenarios that resulted in violation of the requirement(s) of the requirements knowledge graph. A scenario that resulted in violation of a requirement may refer to a circumstance, a setting, an action, an event, sequence of actions/events, and/or other scenario in which the requirement is not met, satisfied, or followed. One or more parameters of the plan may be determined based on the scenario(s) that resulted in violation of the requirement and/or other information. For example, parameters of a drilling tool design and/or a drilling plan may be changed based on analysis of scenario that resulted in violation of the requirement. For instance, based on analysis of scenario that resulted in violation of the requirement, components and/or configuration of the drilling tool may be changed. Based on analysis of scenario that resulted in violation of the requirement, recommended equipment to drill a well and/or how the equipment is operated to drill the well may be changed.

In some implementations, scenario(s) that resulted in violation of the requirement may include one or more simulated scenarios. A simulated scenario may refer to a scenario in a computer simulation in which the requirement is violated. For example, the model constructed by the model component 104 may be run to simulate different scenarios, and the simulated scenarios may be analyzed to determine whether the requirement is satisfied or violated. Violations of the requirement may be fed back to the digital twin to update the model, such as for redesign and/or tradeoff analysis.

Use of simulations may enable improvement in the plan without real-world implementations of the plan. For example, for a drilling tool, it may be expensive to construct the drilling tool and to run the drilling tool through sufficient number of tests and/or real-world uses cases to find scenarios that resulted in violation of the requirement. The scenarios may be simulated (e.g., with different usage conditions) to more quickly determine whether the design will result in violation of the requirement. For example, a requirement may include rule(s) associated with maximum allowed vibration of the drilling tool, and the simulations may be used to determine how often and/or in what conditions the drilling tool experiences vibration in excess of the allowed maximum. The design of the drilling tool may be modified by modifying the model/digital twin based on conditions that resulted in violations of the requirement.

In some implementations, scenario(s) that resulted in violation of the requirement may include one or more real-world scenarios. A real-world scenario may refer to a scenario in the real world in which the requirement is violated. For example, for a drilling tool, the use of the drilling tool in the real world may be monitored to determine whether the requirement is satisfied or violated.

For example, the plan may include a design for a drilling tool, and determining the parameter(s) of the design based on the scenario(s) that resulted in violation of the requirement may include redesigning one or more characteristics of the drilling tool based on the scenario(s) that resulted in violation of the requirement. With the scenario(s) that resulted in violation of the requirement identified, the model/digital twin may be updated with rules that do not violate the requirements, which may result in an improved drilling tool. For instance, the redesign may result in the drilling tool being more resistant to the failure mechanism that resulted in violation of the requirement.

In some implementations, a real-world scenario may be identified based on image classification. For example, for a drilling tool, images of the drilling tool may be captured during and/or after usage of the drilling tool (e.g., to drill a well). The images may be analyzed using image classification to determine whether the drilling tool has satisfied the requirement (e.g., performed drilling with acceptable wear, without breaking) or has violated the requirement (e.g., drilling caused unacceptable wear, breaking). As another example, for a drilling plan, images of the well may be captured/generated during and/or after drilling of a well. The images may be analyzed using image classification to determine whether the drilling operation has satisfied the requirement (e.g., well drilled with stable wall, well drilled with acceptable dimensions) or has violated the requirement (e.g., wall collapse during drilling, well dimensions not acceptable).

FIG. 5 illustrates an example flow 500 for designing a tool. For example, the flow 500 may be used to design components of a drilling tool. Image classification 502 may be performed on images of the component to identify components that have failed for failure classification 504. For example, an AI model may be trained where classification output by the AI model is failure mechanism (e.g., failure due to stress, failure due to vibration, failure due to corrosion). A failure mechanism may correspond to the hazard 508 associated with requirements 510. Cross reference 506 (e.g., natural language processing cross reference to hazard) may include requirements cross referencing from requirements knowledge graph to digital requirements management platform. The requirements knowledge graph may be traversed to identify requirements 510 associated with the hazard 508, which in turn may be used identify rules/constraints implemented in the model based on systems engineering digital twin (where the rules were associated with the requirements).

Rules/constraints in the model may be changed to improve the design of the component, with increased resistance to the identified failure mechanism. Simulations may be run using the updated model to determine acceptability of the updated design. For example, simulation analysis may be used to determine operating scenarios that result in violation of the requirements associated with a model constraints. Improved component design may be generated to reduce probability of failure by changing the component design within all specifications to reduce the likelihood of violating simulation constraints. Trade-offs may be considered for different designs to generate improved component design.

Thus, the design of the component may be changed using the model to be more resilient to the failure mechanism identified as the cause of the failure, and the redesigned component may be manufactured. Thus, use of the requirements knowledge graph may enable automatic and fast redesign of the component.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 and the electronic storage 13 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
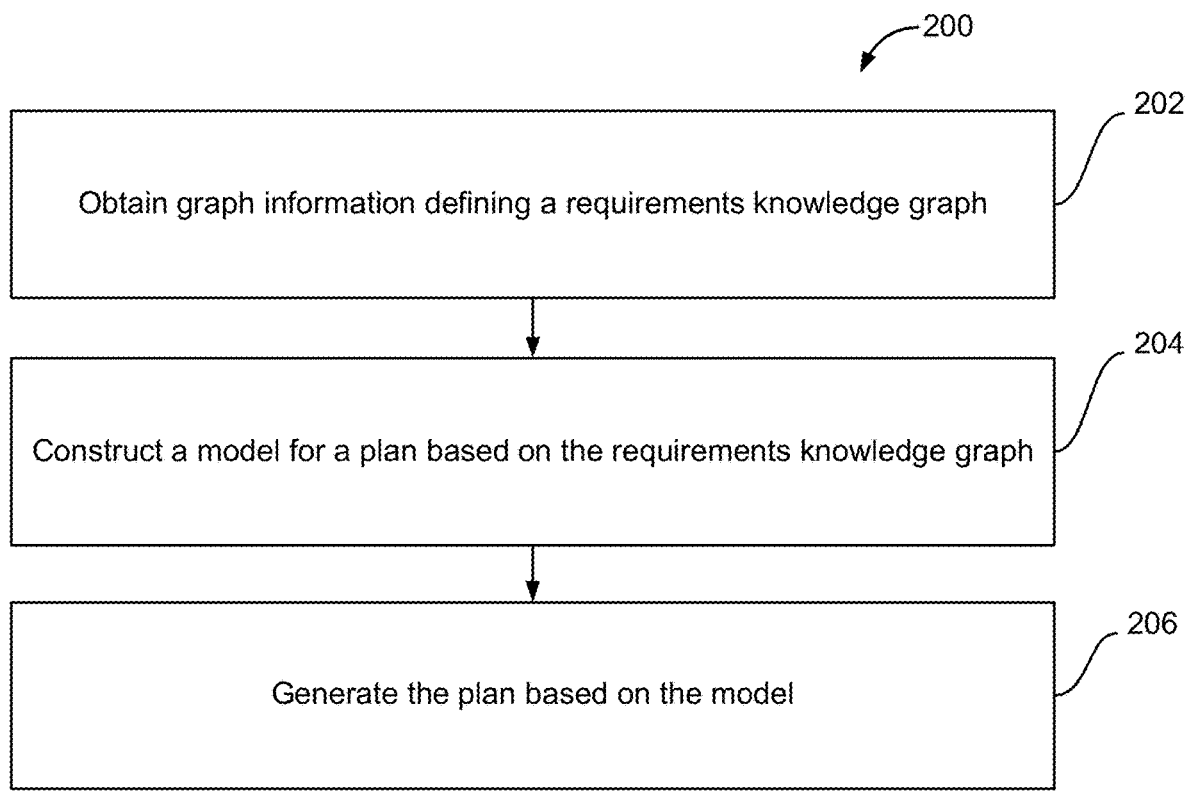
FIG. 2 illustrates an example method for designing plans.

FIG. 2 illustrates method 200 for designing plans. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, graph information and/or other information may be obtained. The graph information may define a requirements knowledge graph. The requirements knowledge graph may include nodes for elements. The element may include a requirement, an unsafe condition, a control object, and a hazard. A connection between the nodes of the requirements knowledge graph defining a relationship between corresponding elements. The requirement may define a rule for the control object to avoid the hazard in the unsafe condition. In some implementation, operation 202 may be performed by a processor component the same as or similar to the graph information component 102 (Shown in FIG. 1 and described herein).

At operation 204, a model for a plan may be constructed based on the requirements knowledge graph and/or other information. In some implementation, operation 204 may be performed by a processor component the same as or similar to the model component 104 (Shown in FIG. 1 and described herein).

At operation 206, the plan may be generated based on the model and/or other information. In some implementation, operation 206 may be performed by a processor component the same as or similar to the plan component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that designs plans, the system comprising:
one or more physical processors configured by machine-readable instructions to:
obtain graph information defining a requirements knowledge graph, the requirements knowledge graph including nodes for elements, the elements including a requirement, an unsafe condition, a control object, and a hazard, the nodes including a requirement node for the requirement, an unsafe condition node for the unsafe condition, a control object node for the control object, and a hazard node for the hazard, connections between the nodes of the requirements knowledge graph defining relationships between corresponding elements, the requirement defining a rule for the control object to avoid the hazard in the unsafe condition, wherein the connections between the nodes of the requirements knowledge graph that define the relationships between the corresponding elements include a first connection between the requirement node and the unsafe condition node, a second connection between the unsafe condition node and the control object node, and a third connection between the unsafe condition node and the hazard node, further wherein the nodes and the connections between the nodes of the requirements knowledge graph enable conversion of the requirement and associated physical characteristics into logical formulations;
construct a model for a plan based on the requirements knowledge graph, wherein the model constructed based on the requirements knowledge graph incorporates, combines, and/or utilizes the logical formulations of the requirement and the associated physical characteristics enabled via the nodes and the connections between the nodes of the requirements knowledge graph to generate the plan; and
generate the plan based on the logical formulations of the requirement and the associated physical characteristics incorporated, combined and/or utilized by the model, the plan including identification, assessment, and/or quantification of risks using systems theoretic process analysis, wherein the plan generated based on the logical formulations of the requirement and the associated physical characteristics incorporated, combined and/or utilized by the model includes a drilling plan for a well or a redesign for a drilling tool.

2. The system of claim 1, wherein a requirement node includes sub-nodes for sub-parts of the requirement.

3. The system of claim 2, wherein the sub-parts of the requirement include a subject, an object, a predicate, and a context, the sub-nodes include a subject sub-node for the subject, an object sub-node for the object, a predicate sub-node for the predicate, and a context sub-node for the context, further wherein the connections between the nodes of the requirements knowledge graph that define the relationships between the corresponding elements include a fourth connection between the requirement node and the subject sub-node, a fifth connection between the requirement node and the object sub-node, a sixth connection between the requirement node and the predicate sub-node, and a seventh connection between the requirement node and the context sub-node.

4. The system of claim 1, wherein generation of the plan based on the model includes:
obtaining violation information, the violation information defining one or more scenarios that resulted in violation of the requirement; and
determining one or more parameters of the plan based on the one or more scenarios that resulted in violation of the requirement.

5. The system of claim 4, wherein the one or more scenarios that resulted in violation of the requirement include a simulated scenario.

6. The system of claim 4, wherein the one or more scenarios that resulted in violation of the requirement include a real-world scenario.

7. The system of claim 6, wherein the real-world scenario is identified based on image classification.

8. The system of claim 1 wherein the one or more physical processors are further configured by the machine-readable instructions to dynamically change constraints and/or limits of a drilling operation at the well using the drilling plan based on the model and conditions of the drilling operation.

9. The system of claim 4, wherein:
the redesign for the drilling tool includes redesign of one or more characteristics of the drilling tool; and
the one or more physical processors are further configured by the machine-readable instructions to modify the drilling tool based on the redesign for the drilling tool.

10. The system of claim 9, wherein determining the one or more parameters of the redesign for the drilling tool based on the one or more scenarios that resulted in violation of the requirement includes redesigning the one or more characteristics of the drilling tool based on the one or more scenarios that resulted in violation of the requirement.

11. A method for designing plans, the method performed by a computing system including one or more processors, the method comprising:

obtaining graph information defining a requirements knowledge graph, the requirements knowledge graph including nodes for elements, the elements including a requirement, an unsafe condition, a control object, and a hazard, the nodes including a requirement node for the requirement, an unsafe condition node for the unsafe condition, a control object node for the control object, and a hazard node for the hazard, connections between the nodes of the requirements knowledge graph defining relationships between corresponding elements, the requirement defining a rule for the control object to avoid the hazard in the unsafe condition, wherein the connections between the nodes of the requirements knowledge graph that define the relationships between the corresponding elements include a first connection between the requirement node and the unsafe condition node, a second connection between the unsafe condition node and the control object node, and a third connection between the unsafe condition node and the hazard node, further wherein the nodes and the connections between the nodes of the requirements knowledge graph enable conversion of the requirement and associated physical characteristics into logical formulations;

constructing a model for a plan based on the requirements knowledge graph, wherein the model constructed based on the requirements knowledge graph incorporates, combines, and/or utilizes the logical formulations of the requirement and the associated physical characteristics enabled via the nodes and the connections between the nodes of the requirements knowledge graph to generate the plan; and generating the plan based on the logical formulations of the requirement and the associated physical characteristics incorporated, combined and/or utilized by the model, the plan including identification, assessment, and/or quantification of risks using systems theoretic process analysis, wherein the plan generated based on the logical formulations of the requirement and the associated physical characteristics incorporated, combined and/or utilized by the model includes a drilling plan for a well or a redesign for a drilling tool.

12. The method of claim 11, wherein a requirement node includes sub-nodes for sub-parts of the requirement.

13. The method of claim 12, wherein the sub-parts of the requirement include a subject, an object, a predicate, and a context, the sub-nodes include a subject sub-node for the subject, an object sub-node for the object, a predicate sub-node for the predicate, and a context sub-node for the context, further wherein the connections between the nodes of the requirements knowledge graph that define the relationships between the corresponding elements include a fourth connection between the requirement node and the subject sub-node, a fifth connection between the requirement node and the object sub-node, a sixth connection between the requirement node and the predicate sub-node, and a seventh connection between the requirement node and the context sub-node.

14. The method of claim 11, wherein generating the plan based on the model includes:

obtaining violation information, the violation information defining one or more scenarios that resulted in violation of the requirement; and determining one or more parameters of the plan based on the one or more scenarios that resulted in violation of the requirement.

15. The method of claim 14, wherein the one or more scenarios that resulted in violation of the requirement include a simulated scenario.

16. The method of claim 14, wherein the one or more scenarios that resulted in violation of the requirement include a real-world scenario.

17. The method of claim 16, wherein the real-world scenario is identified based on image classification.

18. The method of claim 11, further comprising dynamically changing constraints and/or limits of a drilling operation at the well using the drilling plan based on the model and conditions of the drilling operation.

19. The method of claim 14, wherein:

the redesign for the drilling tool includes redesign of one or more characteristics of the drilling tool; and the method further comprises modifying the drilling tool based on the redesign for the drilling tool.

20. The method of claim 19, wherein determining the one or more parameters of the redesign for the drilling tool based on the one or more scenarios that resulted in violation of the requirement includes redesigning the one or more characteristics of the drilling tool based on the one or more scenarios that resulted in violation of the requirement.

* * * * *